United States Patent [19]
Ambrose et al.

[11] Patent Number: 4,760,111
[45] Date of Patent: Jul. 26, 1988

[54] HIGH SOLIDS LOW-TEMPERATURE CURABLE ALLYLETHER-FUNCTIONAL POLYESTER-URETHANES

[75] Inventors: Ronald R. Ambrose, Allison Park; Delano R. Eslinger, Valencia; Jerome A. Seiner, Pittsburgh, all of Pa.

[73] Assignee: PPG Industries, Inc., Pittsburgh, Pa.

[21] Appl. No.: 119,124

[22] Filed: Nov. 10, 1987

[51] Int. Cl.$^4$ .............................................. C08G 18/68
[52] U.S. Cl. ................................... 524/738; 524/770; 528/48; 528/49; 528/50; 528/56; 528/75

[58] Field of Search ................. 524/738, 770; 528/48, 528/49, 50, 56, 75

[56] References Cited

U.S. PATENT DOCUMENTS 4,289,682 9/1981 Peters ..................................... 528/75

Primary Examiner—Maurice J. Welsh
Attorney, Agent, or Firm—Godfried R. Akorli

[57] ABSTRACT

Disclosed herein are allylether-functional unsaturated polyester-urethanes and curable compositions containing the same.

17 Claims, No Drawings

HIGH SOLIDS LOW-TEMPERATURE CURABLE ALLYLETHER-FUNCTIONAL POLYESTER-URETHANES

BACKGROUND OF THE INVENTION

1. Field of the Invention

The present invention relates to high solids low-temperature curable resinous compositions. More specifically, the invention relates to resinous compositions containing allylether-functional unsaturated polyester-urethanes.

2. Brief Description of the Prior Art

For a number of coating applications, there are employed low-temperature curable two-package systems containing active hydrogen-functional materials and isocyanate curing agents. However, due to health-related problems associated with exposure to, and unsafe handling of isocyanates, two-package systems containing isocyanates are becoming less attractive. Hence, there is a need for alternate curable compositions which cure at ambient or low temperatures.

There is a particular need for high solids low-temperature curable compositions that can be applied to thermally sensitive materials, such as plastics and woods, and other materials which are not conducive to high-temperature cure. High solids compositions are particularly desirable since these coatings usually contain reduced quantities of volatile organic contents (VOC). The present invention provides for high solids curable compositions containing allylether-functional polyester-urethanes.

Art-related compositions which have been suggested for use as low-temperature curable compositions differ from the composition of this invention. Illustratively, in U.S. Pat. No. 4,005,041, allylether-functional polyurethanes, described therein, are very limited in scope. They are prepared with glycerol derivatives with secondary hydroxy groups and hydroxy-functionality greater than two. The polyurethanes derived therefrom can be made only with isophorone diisocyanate, perhaps because of the selectivity afforded by the isophorone diisocyanates. The use of other isocyanates are said to result in gelation. In contrast, in the present invention, a variety of isocyanates can be employed in preparing the polyurethanes without gelling the resultant product.

Also, the allylether-functional polyurethanes, described in U.S. Pat. No. 4,005,041, are of a nature that gives them a prescribed solubility in solvents with Kauri-Butanol (KB) values of less than 40. Apparently, hydrophobic groups associated with glycidyl esters, used therein, contribute to the prescribed solubility of these polyurethanes. In another contrast, the allylether polyurethanes of the present invention are of such a nature that makes them relatively insoluble in solvents of such low KB values.

SUMMARY OF THE INVENTION

The present invention encompasses a resinous composition of an allylether-functional unsaturated polyester-urethane which is prepared from (a) an essentially linear acid or hydroxy-functional unsaturated polyester, (b) a diisocyanate, and (c) an allylether-functional active hydrogen-containing material. The linear unsaturated polyester can be prepared by reacting (i) an acid functional material consisting essentially of a diacid, an anhydride, or a mixture thereof; and (ii) a hydroxy-functional material consisting essentially of diols.

Curable compositions containing the above allylether-functional polyester-urethanes are of high solids; they are ambient or low temperature curable and they provide good "early" and "final" hardness. Thus, coating compositions formulated therewith are well suited to applications on substrates that are not conducive to high-temperture treatment or to other applications where low-temperature curing is, otherwise, required.

DETAILED DESCRIPTION OF THE INVENTION

In preparing the unsaturated polyesters, linear diols or equivalents thereof and linear diacids or equivalents thereof can be employed. The diols, useful herein, typically contain from about 2 to 20 carbon atoms or higher and preferably about 2 to 14 carbon atoms. Illustrative, but non-limiting examples of the diols are selected from the group consisting of 1,6-hexanediol; neopentyl glycol; 2,2,4-trimethyl-1,3-pentanediol; 1,4-butanediol; cyclohexanediol; cyclohexanedimethanol, and 2,2-dimethyl-3-hydroxypropyl-2,2-dimethyl-3-hydroxypropionate. A non-limiting example of an equivalent of the diols can be as follows. Diepoxides may be considered effectively as diols when reacted with diacids at temperatures below 100° C. to produce equivalent linear polyesters. Monoepoxides may be considered effectively as diols when reacted at temperatures above 100° C. to produce equivalent linear polyesters.

The diacide or equivalents thereof typically contain from about 2 to about 20 carbon atoms or higher and preferably about 2 to about 14 carbon atoms. Illustrative, but non-limiting, examples of the diacide are selected from the group consisting of maleic anhydride, fumaric acid, tetrahydrophthalic anhydride, hexahydrophthalic anhydride, methylhexahydrophthalic anhydride, chlorendic anhydride, phthalic acid, isophthalic acid, terephthalic acid, dimethyl 1,4-cyclohexane dicarboxylate, and an mixture thereof. Typically, a mixture of the unsaturated diacide and the anhydrides are employed.

Reaction of the diols and diacids can be conducted as follows. Reaction temperatures of 150° to 200° C. and preferably 160° to 180° C. can be employed over a period of time until an acid value of about 10 mg KOH/gm is attained. In accordance with this invention, it is recommended that necessary steps be taken to preserve the linearity of the resultant polyester since side reactions leading to branched polyesters often occur with unsaturated diacide useful herein. If these side reactions are allowed to occur, unwanted gelled products may be obtained in the subsequent urethane formation step. Furthermore, these side reactions reduce the amount of the active double bonds on the polymer back one which are required for the film-forming via crosslinking reactions with allylether groups described herein. It is, therefore, often necessary to employ in small but effective amounts certain inhibitors, such as di-t-butyl-p-cresol, hydroquinone or benzoquinone, in order to minimize the formation of unwanted branched products. In addition, lower reaction temperatures with azeotropic distillation techniques are employed. The resultant acid or hydroxy-functional unsaturated polyester is said to be essentially linear in that it is essentially difunctional. Typically, the starting reactants consist essentially of difunctional materials.

The ratio of the reactants can be 1:1.1 to 3 and preferably 1:1.2 to 2 of polyacid to polyol, or polyol to acid. The reaction is usually conducted in a solvent and in the presence of a catalyst. Examples of the solvents, useful herein, are the higher boiling aromatic solvents such as xylene and toluene. Examples of the catalysts, useful herein, are butyl stannoic acid and dibutyltinoxide.

Isocyanates are reacted with the acid or hydroxy-functional unsaturated polyesters to form isocyanate prepolymers. The isocyanates are preferably polyisocyanates selected from the group consisting of isophorone diisocyanate, trimethylhexamethylene diisocyanate, 1,6-hexamethylene diisocyanate, 4,4'-methylene-bis-(cyclohexyl isocyanate), toluene diisocyanate, isophorone diisocyanate, an isocyanurate from isophorone isocyanate, a biuret from 1,6-hexamethylene diisocyanate, and a "$C_{36}$-diisocyanate" available from Henkel Chemical Company as a dimer diisocyanate.

The ratio of reactants are about 1.2 to 3:1 and preferably about 1.5 to 2:1 of the isocyanate to the hydroxy or acid group of the polyester. The reaction conditions are as follows: Reaction temperatures of 60° to 110° C. and preferably 80° to 90° C. are employed over a period of two to six hours. Solvents, such as n-butylacetate, methyl isobutyl ketone, and methyl amyl ketone, can be employed. Catalysts, such as dibutyltindilaurate and dibutyltindiacetate, can be employed.

The resultant isocyanate prepolymer is ungelled. It is noteworthy that a wide variety of isocyanates can be employed herein without encountering gelation. This constitutes a distinct advantage over art-related compositions which employ a limited variety of isocyanate types such as isophorone diisocyanate.

Allylether-functional active hydrogen containing materials, such as hydroxy-functional allylethers, are reacted with the isocyanate prepolymer to produce the polyester-urethanes of this invention.

The ratio of reactants employed herein is such that all, or virtually all, of the isocyanate groups are reacted. Typically, ratios of 1:1 isocyanate to hydroxyl group are employed. A slight excess of hydroxyl groups is often desirable in order to ensure that there are no residual isocyanate groups.

Preferably, a hydroxy-functional allylether containing no more than one hydroxy group per molecule (monohydroxy allylether) is employed in order to avoid formation of higher molecular weight products. The monohydroxy allylether is selected from the group consisting of trimethylolpropane diallylether, glycerol diallylether, and the like. It is, however, of note that in commercial grades, the monohydroxy allylethers usually have present therewith, at low concentrations, higher hydroxy-functional allylethers such as trimethylolpropane monoallylether, pentaerythritol diallylether, glycerol monoallylether and the like.

Generally, it should be noted that while the reactants described hereinabove are of low functionality, relatively higher functional reactants can be used provided that the use thereof does not result in gelation of the polyesters or the final polyurethanes. Higher functional reactants can be employed in limited amounts, preferably in combination with the lower functional reactants.

The resultant allylether-functional unsaturated polyester-urethane is of low number average molecular weight. Typically, the number average molecular weight is 2,000 to 5,000 and preferably 2,500 to 3,500. Typically, the allylether-functional unsaturated polyester-urethane is ungelled and well suited to use in high solids curable compositions.

High solids curable compositions can be prepared with the allylether-functional unsaturated polyester-urethanes. The high solids curable compositions can contain from about 20 to 100 and preferably about 40 to 60 percent by weight of the allylether-functional unsaturated polyester-urethane. The rest of the composition may comprise coating additives such as a resinous adjunct or other coating additives.

In a preferred embodiment, the invention encompasses a low-temperature curable composition comprising the allylether-functional unsaturated polyester-urethane. The low-temperature curable compositions can be cured with a catalyst, which is a free-radical catalyst such as Peroxy compounds and/or metal compounds which are usually cobalt salts. Examples of peroxy compounds are methyl ethyl ketone peroxide, cumene hydroperoxide, t-butylhydroperoxide, and the like. Examples of cobalt salts are cobalt acetate, cobalt octoate, cobalt naphthenate, complex cobalt and the like. It is a distinct feature of this invention that these compositions can be cured in the absence of added free-radical catalysts such as peroxides or hydroperoxides. That is, the curable compositions can be cured with only metal compounds comprising cobalt salts or complexes.

In the practice of the invention, the allylether-functional polyester-urethanes can be used as pigment dispersing vehicles. Pigments, useful herein, can be titanium dioxide, iron oxides, silicas, barytes, and zeospheres. Pigment paste prepared therewith can be let down by thinning to the required solids content. The pigment paste may be let down with the allylether-functional polyester-urethane of this invention and/or with other low molecular weight ethylenically unsaturated reactive diluents or other resinous materials. In the latter case, the low molecular weight diluents permit even lower volatile organic contents.

Application of the curable composition can be by conventional techniques, such as roll-coating, dip-coating, or spraying, which is preferred. The composition can be cured under ambient conditions (room temperature) or at low temperatures by forced drying. Under ambient conditions, the cure time to a tack-free state varies from about 4 hours to about 36 hours and preferably about 16 to about 24 hours, depending upon the presence or absence of reactive adjuncts. In a preferred embodiment of the invention, the composition can be cured at temperatures of about 120° F. to 200° F. for about 10 to 30 minutes to provide "early" hardness. By "early hardness" is meant that the dried or tack-free coating exhibits a pencil hardness of 4B or better, preferably 2B or better, at a dry film thickness of which is up to about 1.5 mils. The cured composition continues to cure with improved hardness. The cured composition can attain a "final" hardness in that it has a pencil hardness of about F to H or higher after about three to seven days. The cured coating is not embrittled and thus has a good direct impact resistance. The cured coating is solvent resistant in that it takes more than 100 double-rubs of methyl ethyl ketone to remove it. Additionally, the cured coating also has good adhesion.

These and other aspects of the invention are further illustrated by the following non-limiting examples.

EXAMPLE 1A

An unsaturated polyester polyol, useful herein, was prepared as follows:

| Ingredients | Parts by Weight (grams) |
|---|---|
| 1,6-hexanediol | 4697 |
| Fumaric acid | 6393 |
| Hexahydrophthalic anhydride | 943 |
| Neopentyl glycol | 4139 |
| Butyl stannoic acid | 8.0 |
| Triphenyl phosphite | 8.0 |
| IONOL[1] | 1.6 |
| Xylene | 808 |

[1] Di-t-butyl-p-cresol.

The above ingredients were charged to a four-necked flask fitted with stirrer, nitrogen inlet, thermometer, and condenser. A Dean Stark trap was attached to the condenser for azeotropic distillation. The mixture was heated under a nitrogen atmosphere to about 170° C. with the distillation of water to form the desired polyester. The esterification was monitored by acid value determinations until an acid value of 9.9 was attained. The resultant polyester polyol had a solids content (at 110° C. for two hours) of 93.4, acid value of 10.1 and hydroxyl value of 143.1.

EXAMPLE 1B

An allylether-functional unsaturated polyester-urethane of the invention was prepared as follows.

| Ingredients | Parts by Weight (grams) | |
|---|---|---|
| Polyester polyol of Example 1A | 7180 | Charge A |
| Trimethylhexamethylene diisocyanate (TMDI) | 3209 | |
| Butyl acetate | 2148 | |
| Trimethylolpropane diallylether | 2301 | Charge B |
| Dibutyltindilaurate | 0.15 | |
| Butyl acetate | 1602 | |

The polyesters polyol was added slowly to a TMDI solution in buty acetate and the mixture (Charge A) was heated slowly to 90° C. It was held at this temperature until a constant isocyanate equivalent weight of 1165.1 was attained. At 80° C., Charge B was added. The resultant mixture was held at 74° C. to 80° C. to react out all the isocyanate groups. The final product had a solids content (110° C. for two hours) of 72.8, viscosity of 63.4 stokes, acid value of 4.5, hydroxy value of 64.5, and unsaturated equivalent of 662.59.

EXAMPLE 1C

A coating composition was formulated with the allylether-functional polyester-urethane as follows:

| Ingredients | Parts by Weight (grams) | Resin Solids | Pigment Solids |
|---|---|---|---|
| Grind | | | |
| The polyester-urethane of Example 1B | 53.3 | 40 | — |
| Aromatic 100[1] | 17.6 | — | — |
| PM Acetate[2] | 17.6 | — | — |
| Neosperse 657[3] | 1 | 0.7 | — |
| Lecithin | 1 | 1 | — |
| Zinc octoate (18%) | 3 | 2.4 | — |
| Mekon wax[4] | 2 | 2 | — |
| Bentone 34[5] | 2 | 2 | — |
| Black | 0.1 | — | 0.1 |
| Titanium dioxide | 116 | — | 116 |
| Iron oxide | 14.2 | — | 14.2 |
| Silicone oxide | 19.2 | — | 19.2 |
| Let-down | | | |
| The polyester-urethane of Example 1B | 80 | 60 | — |
| Silicone surfactant (0.48% DC200)[6] | 1 | — | — |
| PM Acetate | 15.45 | — | — |
| Cobalt octoate (12%) | 0.4 | 0.25 | — |
| | 343.85 | 108.35 | 149.5 |

[1] An aromatic solvent available from Exxon Corporation.
[2] Propylene glycol monoethylether available from Dow Chemical Corporation.
[3] A wetting agent available from Tennaco Chemicals.
[4] Available from Petrolite Corporation.
[5] A thixotropic agent available from NL Industries.
[6] Available from Dow Corning Corporation.

Evaluation

The coating was applied to a plastic substrate (available from General Electric Corporation under the tradename "NORYL") and baked for 15 minutes at 150° F. to produce coatings of 1.3 mils with an early hardness of 2B pencil and hardness of 2H pencil, after seven days at ambient temperature.

EXAMPLE 2A

This example further illustrates the preparation of the unsaturated polyester polyols useful herein.

| Ingredient | Parts by Weight (grams) |
|---|---|
| 1,6-hexanediol | 2487 |
| Fumaric acid | 3385 |
| Hexahydrophthalic anhydride | 499 |
| Neopentyl glycol | 2192 |
| Butyl stannoic acid | 4.5 |
| Triphenyl phosphite | 4.5 |
| IONOL | .9 |
| Xylene | 428 |

The polyester polyol having an acid value of 10.8 KOHmg/gm was prepared in a manner similar to Example 1A and used as follows.

EXAMPLE 2B

An allylether-functional unsaturated polyester-urethane of the invention was prepared as follows:

| Ingredients | Parts by Weight (grams) | |
|---|---|---|
| Polyester polyol of Example 2A | 1515 | Charge A |
| [1]MONDUR TD-80 | 561 | |
| Butyl acetate | 424 | |
| Trimethylolpropane diallylether | 548 | Charge B |
| Dibutyltindilaurate | .04 | |
| Butyl acetate | 592 | |

[1] Toluene diisocyanate available from Mobay Chemical Company.

The polyester polyol was added slowly to a MONDUR-TD 80 solution in butyl acetate with a resulting exotherm to 101° C. The resulting mixture (Charge A) was allowed to cool to 90° C. and held at this temperature until a constant isocyanate equivalent weight of 976 was attained. The mixture was cooled to 80° C. and Charge B was added. The resultant mixture was held at 80° C. to react out all the isocyanate groups.

EXAMPLE 3A

This example also illustrates the preparation of the linear unsaturated polyester polyols useful herein.

| Ingredients | Parts by Weight (grams) |
| --- | --- |
| Neopentyl glycol | 3976 |
| 1,6-hexanediol | 4511 |
| Hexahydrophthalic anhydride | 906 |
| Maleic anhydride | 1816 |
| Fumaric acid | 3991 |
| Triphenyl phosphite | 7.6 |
| Butyl stannoic acid | 7.6 |
| IONOL | 1.52 |
| Xylene | 800 |

The materials were charged into a four-necked flask fitted with stirrer, nitrogen inlet, thermometer and condenser. A Dean Stark trap was attached to the condenser for azeotropic distillation. The mixture was heated to about 180° C. with the distillation of water to form the desired polyester. The esterification was monitored by acid value determinations until an acid value of 10.0 KOKmg/gm was attained.

EXAMPLE 3B

An allylether-functional unsaturated polyester-urethane of the present invention was prepared as follows.

| Ingredients | Parts by Weight (grams) | |
| --- | --- | --- |
| Polyester polyol of Example 3A | 6788 | Charge A |
| Trimethylhexamethylene diisocyanate (TMDI) | 3033 | |
| Butyl acetate | 2031 | |
| Trimethylolpropane diallylether | 2538.9 | Charge B |
| Dibutyltindilaurate | .12 | |
| Butyl acetate | 1636.4 | |

The polyester polyol was added slowly to a TMDI solution in butyl acetate (Charge A) and the mixture was heated slowly to 90° C. It was held at this temperature until a constant isocyanate equivalent weight of 1,119 was attained. At 80° C., Charge B was added. The resultant mixture was held at 80° C. to react out all the isocyanate groups.

EXAMPLE 4A

This example shows yet another method of preparing the allylether-functional polyester urethanes of this invention.

| Ingredients | Parts by Weight (grams) |
| --- | --- |
| 1,6-hexanediol | 2649 |
| Maleic anhydride | 3046 |
| Hexahydrophthalic anhydride | 531 |
| Neopentyl glycol | 2335 |
| Butyl stannoic acid | 4.3 |
| Triphenyl phosphite | 4.3 |
| IONOL | .86 |
| Xylene | 429 |

The above was introduced into a four-necked flask fitted with stirrer, nitrogen inlet, thermometer and condenser. A Dean Stark trap was attached to the condenser for azeotropic distillation. The mixture was heated under a nitrogen atmosphere to about 200° C. with the distillation of water to form the desired polyester. The esterification was monitored by acid value determinations until an acid value of 10.8 was attained. The resultant polyester polyol was used in Example 4B as follows:

EXAMPLE 4B

| Ingredient | Parts by Weight (grams) | |
| --- | --- | --- |
| Isophorone diisocyanate | 708 | Charge A |
| Trimethylolpropane diallylether | 493 | |
| Butyl acetate | 400 | |
| Polyester polyol from Example 1A | 1499 | Charge B |
| Butyl acetate | 400 | |
| Dibutyltindilaurate | .03 | |

The trimethylolpropane diallylether was added slowly to a solution of isophorone diisocyanate in butyl acetate (Charge A). The mixture was heated slowly to 90° C. until a constant isocyanate equivalent weight of 376 was attained. The reaction temperature was reduced to 80° C. and B was added. The reaction was allowed to continue at 80° C. until a minimal amount of isocyanate groups remained, yielding an isocyanate equivalent weight of 27,834.

What is claimed is:

1. A resinous composition of an allylether-functional unsaturated polyester-urethane which is prepared from:
    (a) an essentially linear, acid- or hydroxy-functional unsaturated polyester,
    (b) a diisocyanate, and
    (c) allylether-functional active hydrogen-containing material.

2. The composition of claim 1 wherein the polyester is a reaction product of:
    (i) acid functional material consisting essentially of diacids, an anhydride or a mixture thereof;
    (ii) a hydroxy-functional material consisting essentially of a diol.

3. The composition of claim 2 wherein the diol is selected from the group consisting of 1,6-hexanediol; neopentyl glycol; 2,2,4-trimethyl-1,3-pentanediol; 1,4-butanediol; cyclohexanediol; cyclohexanedimethanol, 2,2-dimethyl-3-hydroxypropyl-2,2-dimethyl-3hydroxypropionate, bisphenol A, and a mixture thereof.

4. The composition of claim 2 wherein the diacid, anhydride, or the mixture thereof is selected from the group consisting of maleic acid, maleic anhydride, fumaric acid, tetrahydrophthalic anhydride, hexahydrophthalic anhydride, methylhexahydrophthalic anhydride, chlorendic anhydride, phthalic acid, isophthalic acid, terephthalic acid, dimethyl 1,4-cyclohexane dicarboxylate, and itaconic acid.

5. A composition of claim 4 wherein the diacid, anhydride, or the mixture thereof is selected from the group consisting of tetrahydropthalic anhydride, maleic anhydride, maleic acid, fumaric acid or a mixture thereof.

6. The composition of claim 1 wherein the diisocyanate is selected from the group consisting of isophorone diisocyanate, trimethylhexamethylene diisocyanate, 1,6-hexamethylene diisocyanate, 4,4'-methylene-bis-(cyclohexyl isocyanate) toluene diisocyanate, isophorone diisocyanate, an isocyanurate from isophorone isocyanate, and a biuret from 1,6-hexamethylene diisocyanate, and a dimer diisocyanate.

7. The composition of claim 1 wherein the allylether-functional active hydrogen-containing material is a hydroxy-functional allylether selected from the group consisting of trimethylolpropane diallylether, trimethylolpropane monoallylether, glycerol diallylether, glycerol monoallylether, pentaerythritol diallylether and a mixture thereof.

8. The composition of claim 7 wherein the hydroxy-functional allylether contains no more than one hydroxy group per molecule.

9. The composition of claim 2 wherein the polyester is derived by reacting a diol with a diacid, anhydride or a mixture thereof in the presence of an inhibitor which is di-t-butyl-cresol, hydroquinone or benzoquinone.

10. A high solids curable composition comprising (i) the composition of matter of claim 1 and (ii) a cure catalyst which is a peroxide, a hydroperoxide, cobalt salt or a mixture thereof.

11. The high solids curable composition of claim 10 wherein the cure catalyst is a cobalt salt.

12. A high solids curable composition comprising (i) the composition of matter of claim 9 and (ii) a cure catalyst which is a peroxide, hydroperoxide, a cobalt salt or a mixture thereof.

13. The high solids composition of claim 12 wherein the cure catalyst is a cobalt salt.

14. An article of matter which is prepared by applying to a substrate the curable composition of claim 10 and curing the composition at ambient or low temperatures.

15. An article of matter which is prepared by applying to a substrate the curable composition of claim 11 and curing the composition at ambient or low temperatures.

16. An article of matter which is prepared by applying to a substrate the curable composition of claim 12.

17. An article of matter which is prepared by applying to a substrate the curable composition of claim 13.

* * * * *